(12) United States Patent
Huang

(10) Patent No.: US 11,415,145 B2
(45) Date of Patent: Aug. 16, 2022

(54) VERTICAL PUMP STRUCTURE

(71) Applicant: WALRUS PUMP CO., LTD., New Taipei (TW)

(72) Inventor: Shou Hsiung Huang, New Taipei (TW)

(73) Assignee: Walrus Pump Co., Ltd., New Taipei (TW)

( * ) Notice: Subject to any disclaimer, the term of this patent is extended or adjusted under 35 U.S.C. 154(b) by 241 days.

(21) Appl. No.: 16/704,106

(22) Filed: Dec. 5, 2019

(65) Prior Publication Data

US 2020/0325907 A1 Oct. 15, 2020

(30) Foreign Application Priority Data

Apr. 11, 2019 (TW) .................. 108112691

(51) Int. Cl.
| | |
|---|---|
| *F04D 29/10* | (2006.01) |
| *F04D 29/40* | (2006.01) |
| *F04D 29/12* | (2006.01) |
| *F16J 15/00* | (2006.01) |

(Continued)

(52) U.S. Cl.
CPC ........... *F04D 29/106* (2013.01); *F04D 13/06* (2013.01); *F04D 13/08* (2013.01); *F04D 29/126* (2013.01); *F04D 29/406* (2013.01); *F16J 15/004* (2013.01)

(58) Field of Classification Search
CPC .......... F04D 13/00; F04D 13/06; F04D 13/08; F04D 29/005; F04D 29/007; F04D 29/08; F04D 29/086; F04D 29/10; F04D 29/106; F04D 29/12; F04D 29/126; F04D 13/02; F04D 29/00; F04D 29/04; F04D 29/043; F04D 29/044; F04D 29/40; F04D 29/406;
(Continued)

(56) References Cited

U.S. PATENT DOCUMENTS

| | | | | |
|---|---|---|---|---|
| 3,704,960 A | * | 12/1972 | Zagar | .................... F04D 29/167 |
| | | | | 415/213.1 |
| 3,737,255 A | * | 6/1973 | Emeny | ................ F04D 29/2277 |
| | | | | 417/424.1 |

(Continued)

FOREIGN PATENT DOCUMENTS

| | | |
|---|---|---|
| CN | 1226643 A | 8/1999 |
| CN | 201925235 U | 8/2011 |

(Continued)

*Primary Examiner* — Charles G Freay
*Assistant Examiner* — Chirag Jariwala
(74) *Attorney, Agent, or Firm* — Rosenberg, Klein & Lee

(57) ABSTRACT

A vertical pump structure is adapted to be mounted on a water cooling tank. The vertical pump structure comprises a pump casing, an upper shaft seal, a shaft and a lower shaft seal assembly. An upper annular flange and a lower annular flange are formed on an inner surface of the pump casing. A drain space is formed between the two annular flanges. A drain hole communicates with the draining space and an internal space of the water cooling tank. The shaft is inserted through the two annular flanges. Two gaps, which are formed between the shaft and the two annular flanges, are respectively sealed by the upper shaft seal and the lower shaft seal assembly. Therefore, even if the lower shaft seal assembly fails, the upper shaft seal can still prevent leaking fluid from polluting the work place.

7 Claims, 7 Drawing Sheets

(51) Int. Cl.
*F04D 13/06* (2006.01)
*F04D 13/08* (2006.01)

(58) Field of Classification Search
CPC .... F04D 29/42; F04D 29/426; F04D 29/4293; F16J 15/004
See application file for complete search history.

(56) References Cited

U.S. PATENT DOCUMENTS

| | | | | |
|---|---|---|---|---|
| 2002/0125648 | A1* | 9/2002 | Vedsted | F16J 15/363 277/358 |
| 2008/0206076 | A1* | 8/2008 | Anwer | F04D 13/021 29/700 |
| 2011/0298182 | A1* | 12/2011 | Huang | F04B 53/164 277/500 |
| 2017/0211581 | A1* | 7/2017 | Svarre | F04D 17/08 |

FOREIGN PATENT DOCUMENTS

| | | | | |
|---|---|---|---|---|
| CN | 102678580 A | | 9/2012 | |
| CN | 103711708 A | | 4/2014 | |
| CN | 208380871 U | | 1/2019 | |
| DE | 20004233 U1 | * | 5/2000 | ............ F04D 13/06 |
| EP | 3199815 A1 | | 8/2017 | |
| EP | 3441619 A1 | | 2/2019 | |
| JP | H7-7890 A | | 1/1995 | |
| JP | 2003-343482 A | | 12/2003 | |
| JP | 2003343482 A | * | 12/2003 | ............ F04D 29/10 |
| JP | 2014-109195 A | | 6/2014 | |
| JP | 2014109195 A | * | 6/2014 | ............ F04D 29/10 |
| JP | 2017002842 A | | 1/2017 | |
| KR | 100953260 B1 | * | 4/2010 | ............ F04D 19/02 |
| KR | 2017092808 A | * | 8/2017 | ............... F04D 1/06 |
| TW | M389172 U1 | | 9/2010 | |
| TW | M541525 U | | 5/2017 | |
| TW | M-541525 U | * | 5/2017 | ............ F04D 29/08 |
| WO | 2013143451 A1 | | 10/2013 | |

* cited by examiner

VERTICAL PUMP STRUCTURE

BACKGROUND OF THE INVENTION

1. Field of the Invention

The present invention relates to a vertical pump structure, especially to a vertical pump that is installed on a water cooling tank of a lathe or a milling machine, wherein the cooing tank is placed on a factory floor.

2. Description of the Prior Arts

As shown in FIG. 7, a conventional vertical pump is usually installed on a water cooling tank 91 of a machining tool, such as a lathe or a milling machine in a factory. The water cooling tank 91 is placed on the floor of the factory.

The vertical pump includes a pump casing 92, a blade shell 93 and a motor. The motor is fixed on a top surface of the pump casing 92. The pump casing 92 is fixed on an upper opening of the water cooling tank 91. A bottom of the pump casing 92 extends downward into the water cooling tank 91. A top end of the pump casing 92 extends upward and protrudes from a top of the water cooling tank 91. A motor mounting wall 921 is annularly formed around a top of the pump casing 92. The motor is fixed on the top of the motor mounting wall 921, and a drive shaft of the motor is inserted downward into the pump casing 92. The bottom of the pump casing 92 has a water inlet 922. A water outlet 923 is formed on a side of the pump casing 92 and located above the water cooling tank 91. The blade shell 93 is mounted on the bottom of the pump casing 92 and forms an accommodating space together with the pump casing 92. The accommodating space can be roughly divided into a pump chamber 924 located in the pump casing 92 and an impeller chamber 931 located in the blade shell 93. Multiple impellers 95 are located in the impeller chamber 931. A water inlet 932 is formed in the bottom of the blade shell 93. The fluid in the water cooling tank 91 flows into the impeller chamber 931 via the water inlet 932. The top of the pumping shaft 94 is connected to the motor. The other end of the pumping shaft 94 extends downward through the pump casing 92 and is inserted into the blade shell 93 to rotate the impellers 95. The rotation of the impellers 95 makes the fluid inside the impeller chamber 931 flow toward the pump chamber 924. The pressure of the fluid gradually increases as the fluid flows upward toward the pump chamber 924. The fluid in the blade shell 93 flows upward through the water inlet 922 of the bottom of the pump casing 92 into the pump chamber 924, and then the fluid is drawn out of the water cooling tank 91 through the water outlet 923 above the pump casing 92.

Regarding the combination of the pumping shaft 94 and the pump casing 92, to be specific, an annular flange 925 is formed around an inner surface of the pump casing 92. The annular flange 925 roughly divides the inner space of the pump casing 92 into an upper portion and a lower portion. A mounting hole 9251 is formed in the center of the annular flange 925. The pumping shaft 94 can be inserted into the mounting hole 9251. A shaft seal 96 is disposed between the mounting hole 9251 and the pumping shaft 94 to prevent the pressurized fluid in the pump chamber 924 from escaping through the gap between the pumping shaft 94 and the annular flange 925 and leaks upward.

However, due to the higher fluid pressure in the pump chamber 924, the shaft seal 96 cannot completely prevent leakage of fluid in the pump chamber 924. Because the height of the annular flange 925 and the mounting hole 9251 corresponds to the upper opening of the water cooling tank 91, once the leakage occurs, the leaked fluid will quickly overflow from the annular flange 925 to the top surface of the water cooling tank 91, and then overflow to the factory floor, which not only makes the floor of the factory slippery due to accumulated water and oil, but also pollutes the work place and causes inconvenience to the user. The fluid in the pump chamber 924 may even spray upwardly through the gap between the pumping shaft 94 and the annular flange 925, damaging the motor fixed on the top of the pump casing 92.

Therefore, the vertical pump in the prior art needs to be improved.

To overcome the shortcomings, the present invention provides a vertical pump structure to mitigate or obviate the aforementioned problems.

SUMMARY OF THE INVENTION

The main objective of the present invention is to provide a vertical pump structure to prevent fluid leaking from the pump chamber from polluting the work place or damaging a motor of the pump.

In order to achieve the above objective, the present invention provides a vertical pump structure adapted to be mounted through a mounting opening of a water cooling tank. The vertical pump structure comprises a pump casing, a shaft, an upper shaft seal, a sealing cover, a lower shaft seal assembly, and three fixing bolts. The pump casing is adapted to be mounted through the mounting opening of the water cooling tank and closes the mounting opening of the water cooling tank. The pump casing comprises a water inlet, a water outlet, a drain hole, an upper annular flange, a lower annular flange and a water outlet passage. The water inlet is formed in a bottom of the pump casing. A position of the water outlet is higher than a position of the mounting opening of the water cooling tank. The drain hole is formed in a wall of the pump casing, and a position of the drain hole is lower than the position of the mounting opening of the water cooling tank. The upper annular flange is formed around an inner surface of the pump casing to form an upper mounting hole. A position of the upper mounting hole corresponds in height to the position of the mounting opening of the water cooling tank. The lower annular flange is formed around the inner surface of the pump casing to form a lower mounting hole. The upper annular flange and the lower annular flange are disposed apart from each other. A drain space is formed between the upper annular flange and the lower annular flange, and communicates with the drain hole. The water outlet passage has a top opening and a bottom opening. The top opening communicates with the water outlet. The bottom opening is located under the lower annular flange and communicates with the water inlet. The shaft is mounted through the upper mounting hole and the lower mounting hole of the pump casing. The shaft is mounted through the upper mounting hole and the lower mounting hole of the pump casing. The upper shaft seal is mounted between an inner surface of the upper mounting hole and the shaft, and seals a gap formed between the inner surface of the upper mounting hole and the shaft. The sealing cover is detachably disposed between the inner surface of the upper mounting hole and the upper shaft seal. An outer annual surface of the sealing cover is attached to the inner surface of the upper mounting hole. The sealing cover and the upper shaft seal together seal the gap between the inner surface of the upper mounting hole and the shaft. The lower shaft seal assembly is mounted between an inner surface of the lower mounting hole and the shaft, and closes a gap formed between the inner surface of the lower mounting hole and the shaft. An inner diameter of the upper mounting hole is greater than an outer diameter of the lower shaft seal assembly such that the lower shaft seal assembly passes through the upper mounting hole. The three fixing bolts are annularly disposed apart from each other and located around the shaft. The three fixing bolts are located in the drain space and fastened to the lower shaft sealing assembly and abutting against the shaft. A position of the three fixing bolts corresponds to the position of the drain hole in height.

The advantage of the present invention is that the pump casing further comprises an upper annular flange and a lower annular flange which are disposed apart from each other. The lower annular flange and the lower shaft seal assembly together seal the pumped fluid under the lower annular flange. A drain space is formed between the lower annular flange and the upper annular flange, and the upper annular flange and the upper shaft seal together seal a top of the drain space.

Therefore, even if the lower shaft seal assembly fails and causes the fluid under the lower annular flange to leak upward or spray into the drain space from around the lower shaft seal assembly, the upper annular flange and the upper shaft seal will seal the leaking or spraying fluid inside the drain space, and the fluid in the drain space is then guided back to the water tank by the drain hole to prevent fluid from accumulating in the drain space. The double sealing structure of the present invention prevents fluid from leaking out of the water cooling tank through the shaft seal, which can greatly solve the problem that the leakage from the shaft seal of the conventional vertical pump pollutes the work place or causes damage to the motor.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
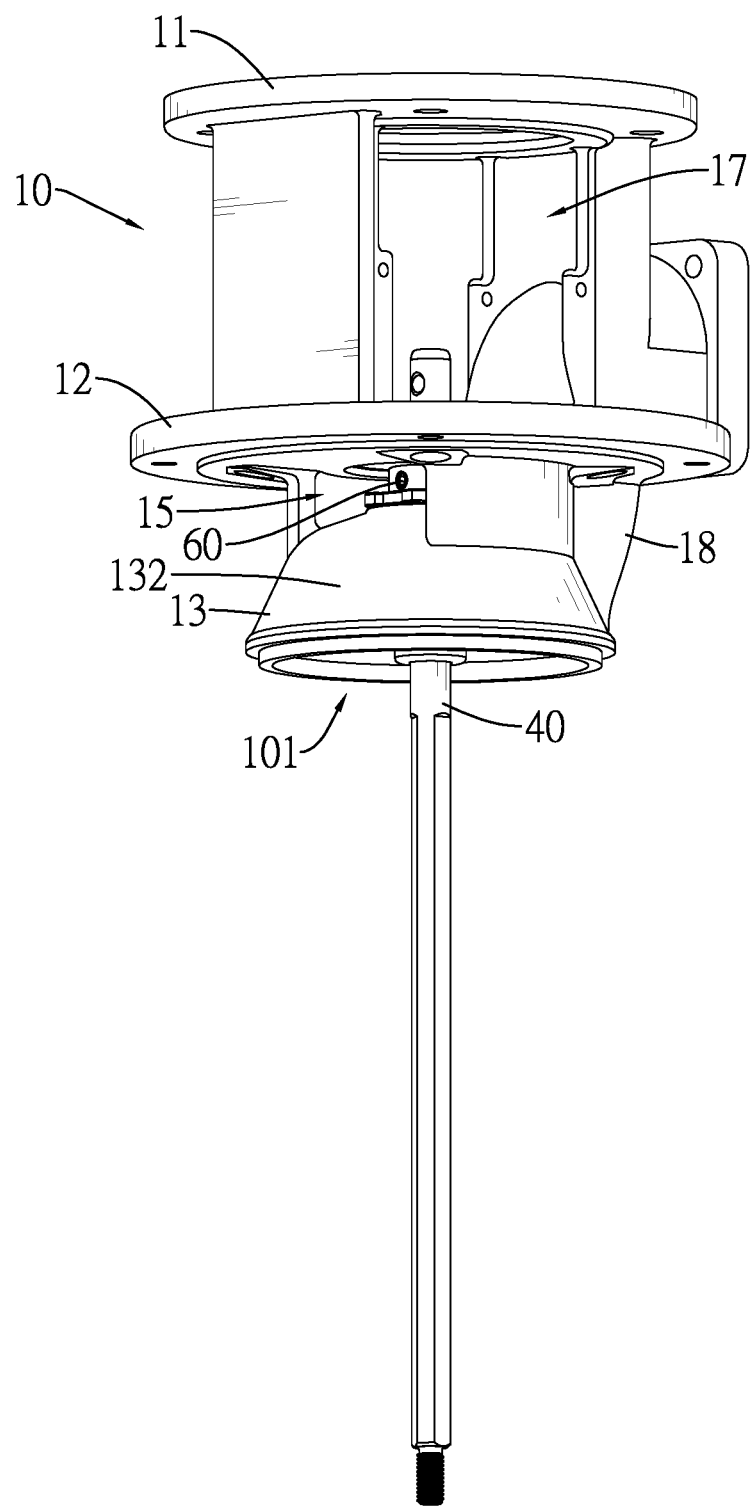
FIG. 1 is a perspective view of a vertical pump structure in accordance with the present invention.

With reference to FIGS. 1 to 4, a vertical pump structure in accordance with the present invention is mounted in a mounting opening B of a water cooling tank A. A motor can be mounted on a top of the vertical pump structure. The vertical pump structure comprises a pump casing 10, an upper shaft seal 30, a shaft 40, and a lower shaft seal assembly 50, and in a preferred embodiment, the vertical pump structure further comprises a sealing cover 20 and multiple fixing bolts 60.

Figure 2:
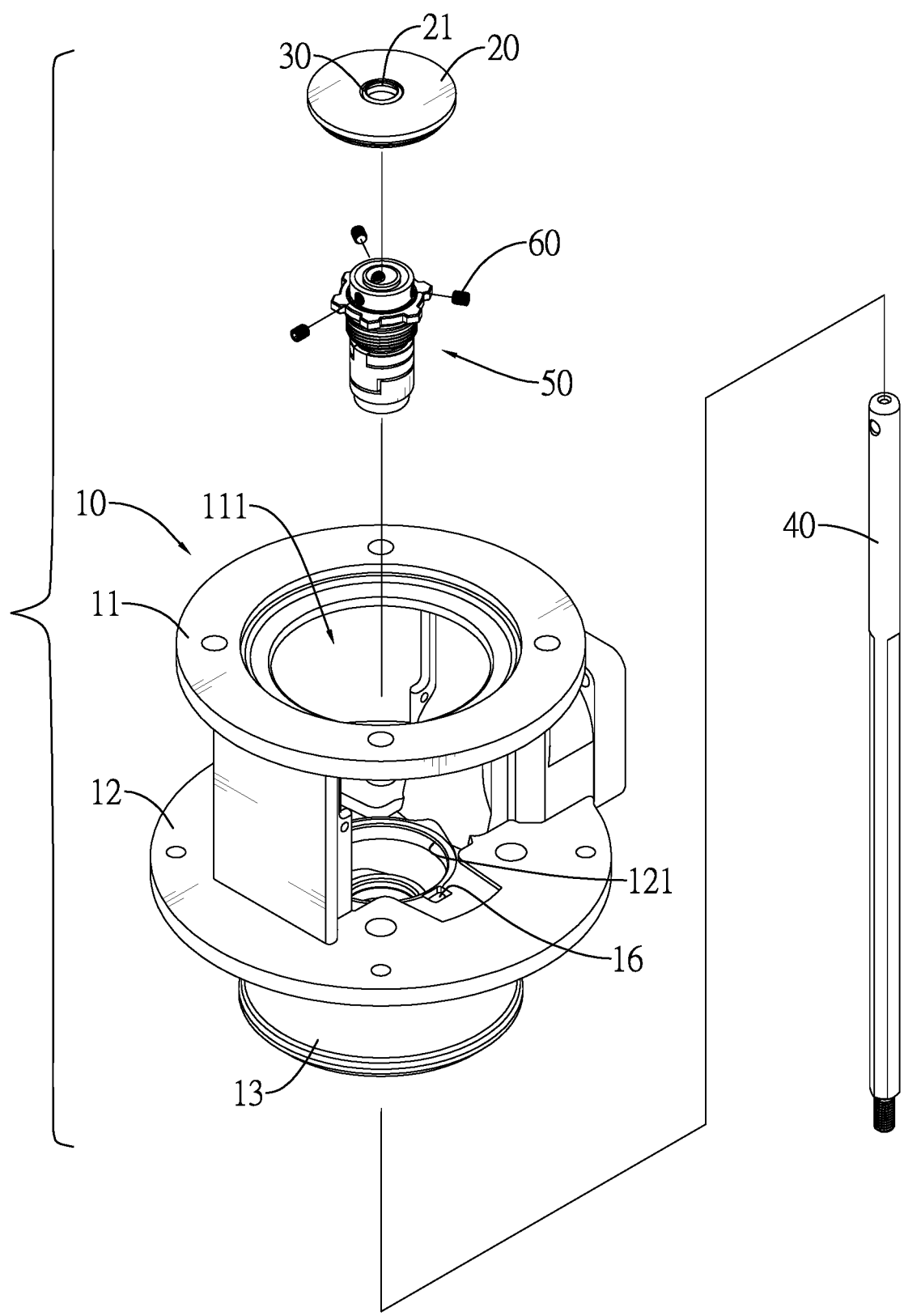
FIG. 2 is an exploded view of the vertical pump structure in FIG. 1.
Figure 3:
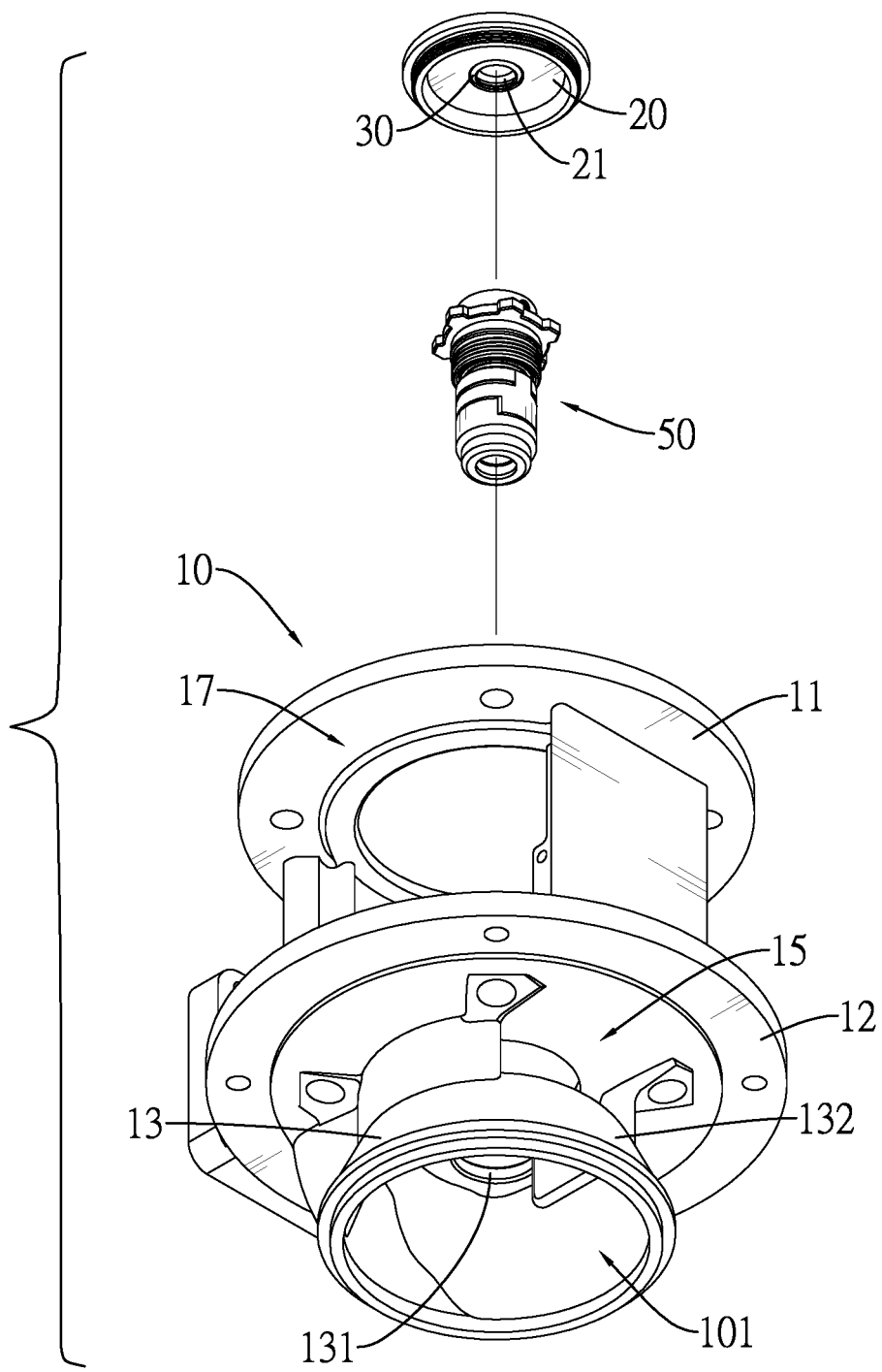
FIG. 3 is another exploded view of the vertical pump structure in FIG. 1.
Figure 4:
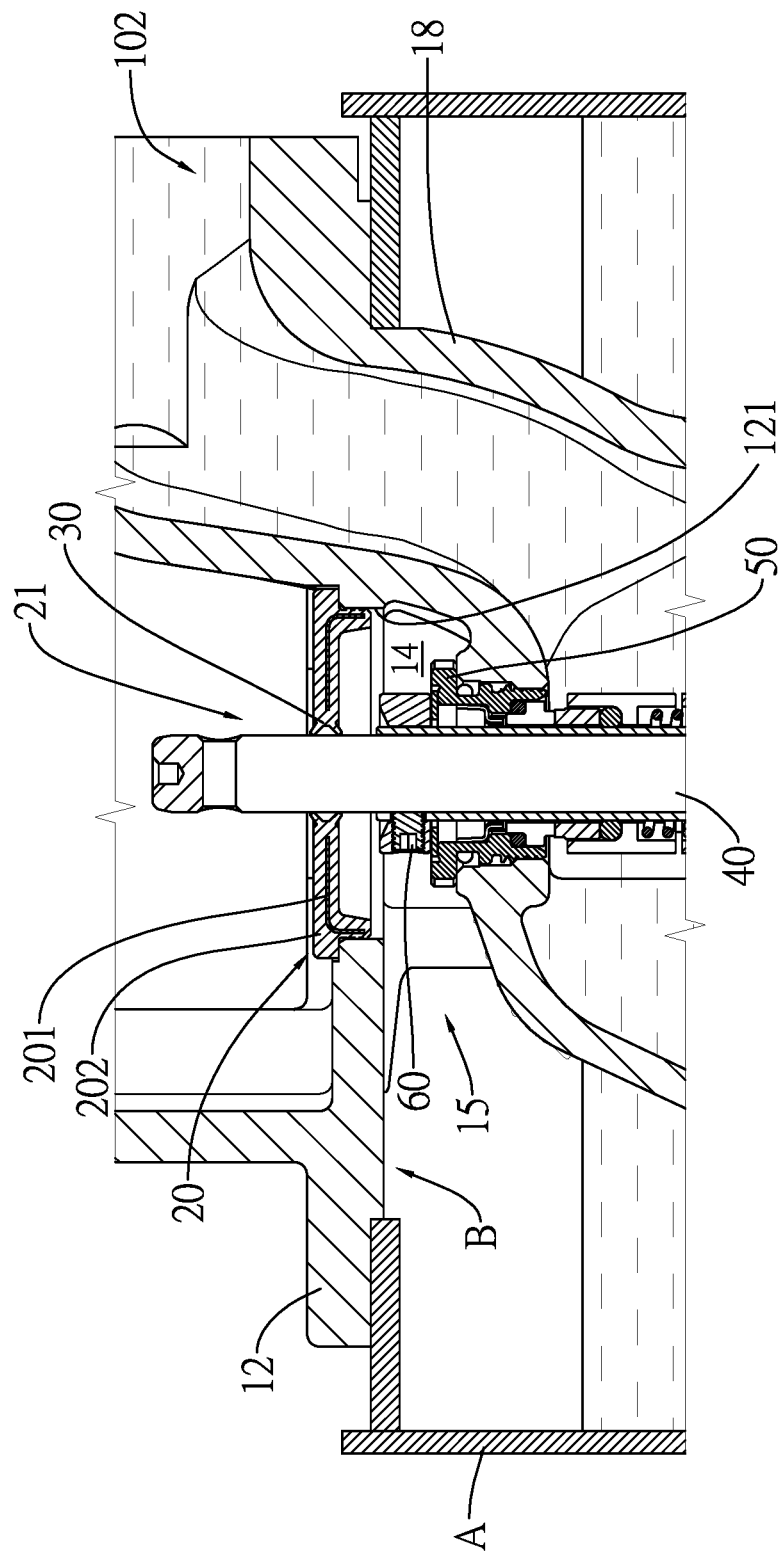
FIG. 4 is a side sectional view in partial section of the vertical pump structure in FIG. 1.

With reference to FIGS. 1, 2, and 4, the pump casing 10 is mounted through the mounting opening B of the water cooling tank A, and closes the mounting opening B. A motor mounting wall 11 is annularly formed on a top of the pump casing 10 and located above the upper annular flange. A motor mounting hole 111 is formed in the motor mounting wall 11. The motor can be fixed on the top of the motor mounting wall 11, and the driving shaft of the motor can be inserted into the pump casing 10 through the motor mounting hole 111. The pump casing 10 has a water inlet 101 and a water outlet 102. The water inlet 101 is formed in a bottom of the pump casing 10, and a position of the water outlet 102 is higher than a position of the mounting opening B of the water cooling tank A.

An upper annular flange 12 is formed around an inner surface of the pump casing 10 to form an upper mounting hole 121. A position of the upper mounting hole 121 corresponds in height to a position of the mounting opening B of the water cooling tank A, which means the height of the upper mounting hole 121 is substantially the same as the height of the mounting opening B instead of being exactly the same. For example, the height of the upper mounting hole 121 may be slightly lower or higher than the height of the mounting opening B.

Figure 5:
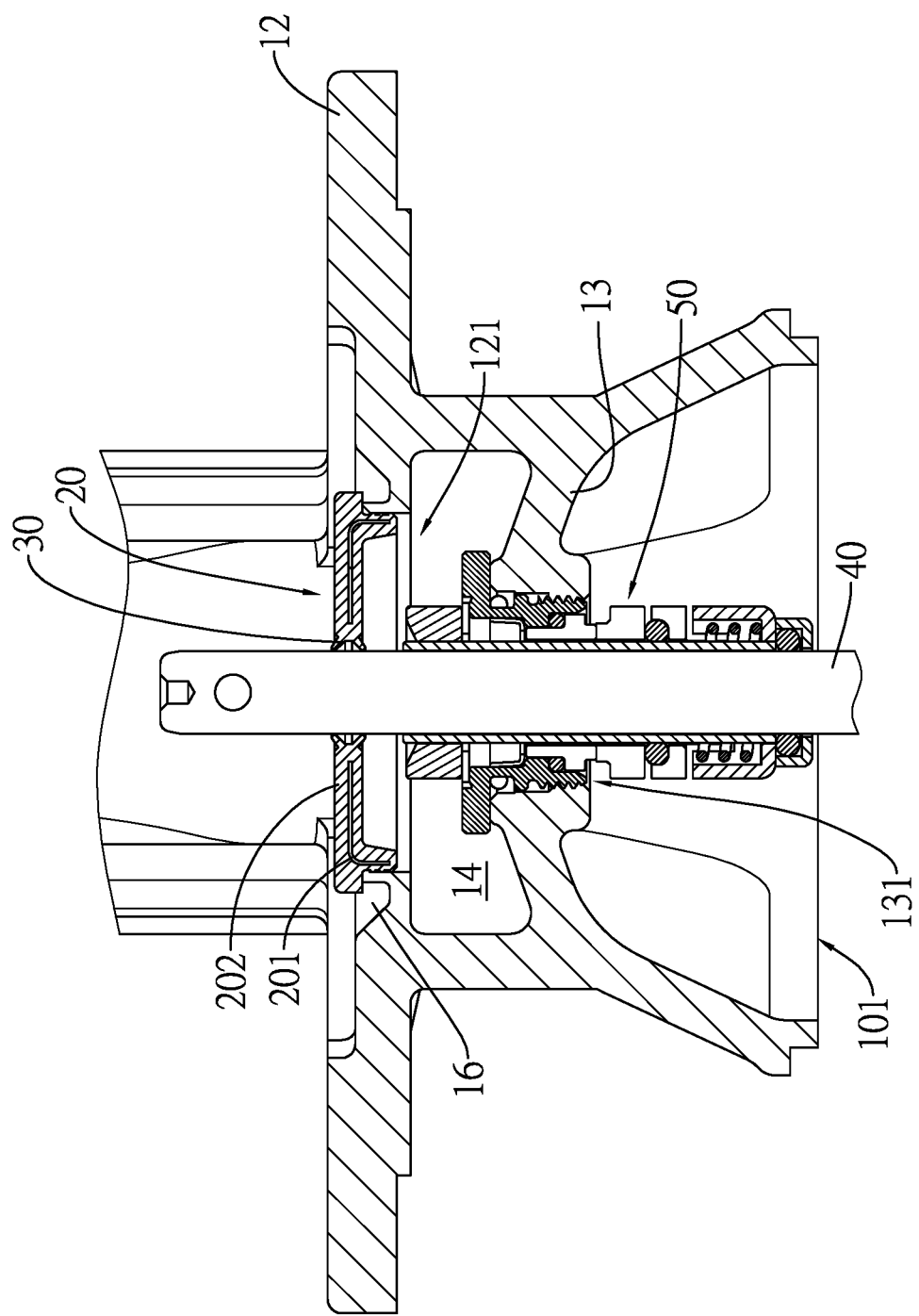
FIG. 5 is a side sectional view of the vertical pump structure in FIG. 1.

With reference to FIGS. 2, 4, and 5, in a preferred embodiment, the sealing cover 20 is detachably disposed in the upper mounting hole 121, and the sealing cover 20 includes a rigid inner layer 201 and an elastic outer layer 202. A rigidity of the rigid inner layer 201 is greater than a rigidity of the elastic outer layer 202. The rigid inner layer 201 is made of a highly rigid material to maintain the shape of the sealing cover 20. The elastic outer layer 202 is made of an elastic material and wraps around the rigid inner layer 201.

By the elasticity of the elastic outer layer 202, an outer annular wall of the sealing cover 20 is closely abutted against the inner surface of the upper mounting hole 121 to effectively prevent fluid from leaking between the sealing cover 20 and the upper mounting hole 121.

With reference to FIGS. 2 and 5, in the preferred embodiment, in order to facilitate the removal of the sealing cover 20, two recesses 16 are formed on the top surface of the upper annular flange 12. The two recesses 16 are respectively adjacent to opposite sides of the upper mounting hole 121 and extend under a periphery of the sealing cover 20. The pump casing 10 has two service openings 17 (as shown in FIG. 1). Height positions of the service openings are between the top of the upper annular flange 12 and a bottom of the motor mounting wall 11. A screwdriver can be inserted into the recesses 16 by the service openings 17, and then push the edge of the sealing cover 20 with a screwdriver to separate the sealing cover 20 from the upper annular flange 12. The positions of the two service openings 17 correspond to those of the two recesses 16 respectively, but the number of the recesses 16 and the service openings 17 is not limited to two, and may be only one.

With reference to FIGS. 1, 4, and 5, the lower annular flange 13 is formed around the inner surface of the pump casing 10 like the upper annular flange 12. The lower annular flange 13 is located under the upper annular flange 12. The lower annular flange 13 and the upper annular flange 12 are disposed apart from each other, such that a drain space 14 is formed between the lower annular flange 13 and the upper annular flange 12. The water inlet 101 is formed by the periphery of the lower annular flange 13.

The water outlet passage 18 has a top opening and a bottom opening. The top opening communicates with the water outlet 102. The bottom opening is located under the lower annular flange 13 and communicates with the water inlet 101. When the pump delivers fluid, the fluid flows to the bottom of the lower annular flange 13 from the water inlet 101 and then flows to the water outlet 102 through the water outlet passage 18.

The drain hole 15 is formed in a wall of the pump casing 10, and communicates with the drain space 14. A position of the drain hole 15 is lower than the position of the mounting opening B of the water cooling tank A in height. The drain space 14 communicates with an internal space of the water cooling tank A through the drain hole 15. When the fluid leaks into the drain space 14, said fluid can flow back to the water cooling tank through the drain hole 15 without accumulating in the drain space 14. In the preferred embodiment, the lower annular flange 13 protrudes to form a slope portion 132. The slope portion 132 is located under an opening of the drain hole 15 and surrounds the lower annular flange 13. The fluid drained from the drain hole 15 is guided back to the water cooling tank A by the slope portion 132. The slope portion 132 is not limited to surrounding the lower annular flange 13, as long as a slope is formed below the opening of the drain hole 15 so as to guide the fluid drained from the drain hole 15 to the water cooling tank A.

With reference to FIGS. 2 and 3 to 5, the sealing cover 20 has a shaft hole 21. The lower annular flange 13 surrounds the sealing cover 20 to form a lower mounting hole 131. The top end of the shaft 40 is used to connect the motor and the other end of the shaft 40 extends downward through the shaft hole 21 and the lower mounting hole 131 to transmit the power of the motor.

With reference to FIGS. 2 and 4, the elastic outer layer 202 of the sealing cover 20 extends to the inner surface of the shaft hole 21. Inside the shaft hole 21, an edge of the elastic outer layer 202 is formed around a center of the shaft hole 21, which forms the upper shaft seal 30, that is, the upper shaft seal 30 is integrally formed on the elastic outer layer 202 of the sealing cover 20. The upper shaft seal 30 seals the gap between the inner surface of the shaft hole 21 and the shaft 40. The lower shaft seal assembly 50 is mounted between the inner surface of the lower mounting hole 131 and the shaft 40. The lower shaft seal assembly 50 seals the gap formed between the inner surface of the lower mounting hole 131 and the shaft 40. Thereby, even if the lower shaft seal assembly 50 fails to seal, causing the pumped fluid to spray upward through the gap between the surface of the lower mounting hole 131 and the shaft 40, the upper annular flange 12, the sealing cover 20 and the upper shaft seal 30 can effectively confine the sprayed fluid in the drain space 14. But the upper shaft seal 30 is not limited to being integrally formed with the elastic outer layer 202 of the sealing cover 20. Moreover, in other preferred embodiments, the sealing cover 20 can be omitted, meanwhile the upper shaft seal 30 is mounted between the inner surface of the upper mounting hole 121 and the shaft 40, and seals the gap formed between the inner surface of the upper mounting hole 121 and the shaft 40.

With reference to FIGS. 2 and 4, the fixing bolts 60 are used to secure the lower shaft seal assembly 50. The fixing bolts 60 are located in the drain space 14. The fixing bolts 60 are fastened to the lower shaft seal assembly 50 and abut against the shaft 40. In the preferred embodiment, a plurality of fixing bolts 60 are annularly disposed apart from each other, and are located around the shaft 40. The shaft 40 can be positioned in alignment with the center of the vertical pump structure by fastening the fixing bolts 60 equi-distantly. In the preferred embodiment, the heights of the fixing bolts 60 are the same, and the positions of the fixing bolts 60 correspond to the position of the drain hole 15 in height. As a result, a screwdriver or a hex wrench can be inserted into the drain space 14 via the drain hole 15 to rotate the fixing bolts 60. Further, in the present invention, the fixing bolts 60 may be detached without passing through the drain hole 15, and a through hole may be additionally provided in the pump casing 10 so as to insert the tool into the drain space 14 to remove the fixing bolts 60 instead of removing the fixing bolt 60 through the drain hole 15.

Figure 6:
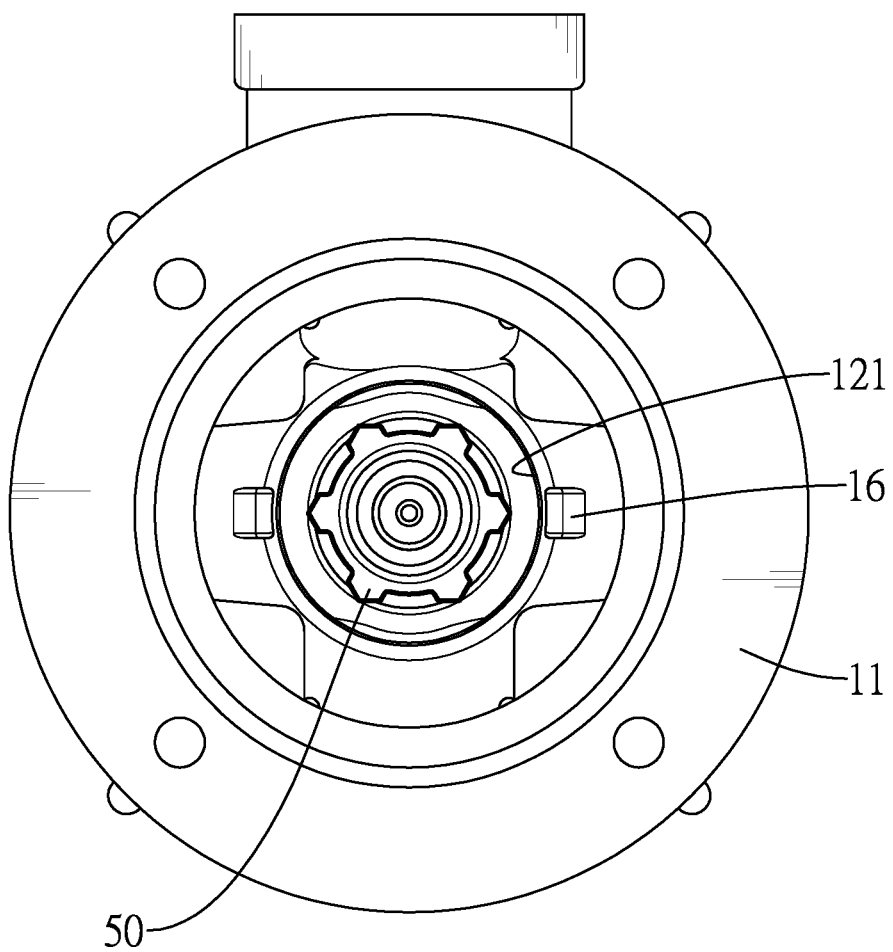
FIG. 6 is a top view of the vertical pump structure in FIG. 1.
Figure 7:
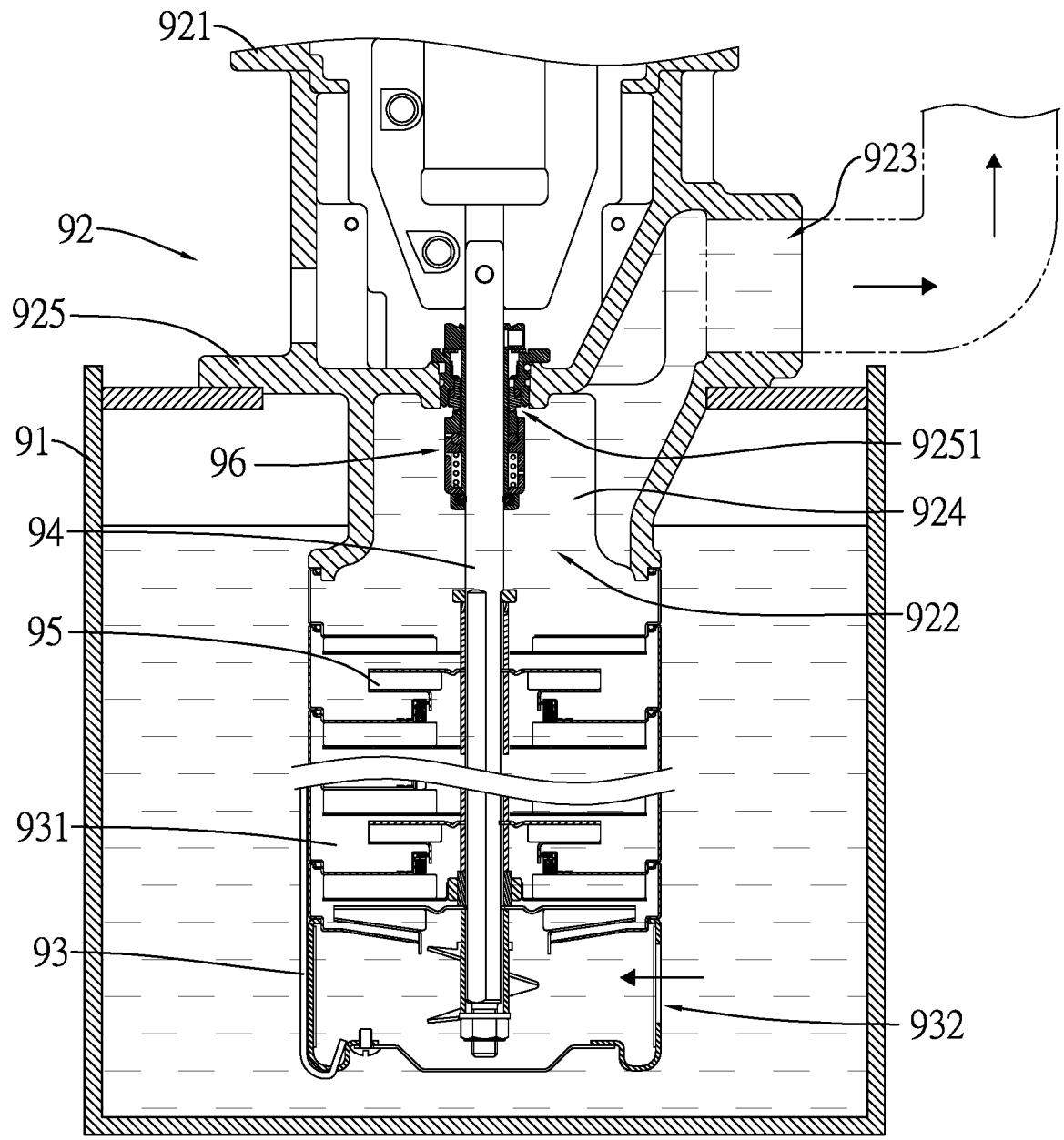
FIG. 7 is a partial side sectional view of a conventional vertical pump.

With reference to FIGS. 5 and 6, in the preferred embodiment, an inner diameter of the upper mounting hole 121 is greater than an outer diameter of the lower shaft seal assembly 50. So when replacing the lower shaft seal assembly 50, the lower shaft seal assembly 50 can be conveniently pulled or inserted into the present invention directly from the upper mounting hole 121.

A vertical pump structure in accordance with the present invention is used in the same manner as a conventional vertical pump, except that the sealing cover 20 must be removed during replacement of the shaft seal assembly 50.

In summary, the present invention provides an upper annular flange and a lower annular flange which are disposed apart from each other. Even if the lower shaft seal assembly fails, the leaking fluid is returned to the water cooling tank by the drain space between the two annular flanges, which can solve the problem that the leakage from a shaft seal of the conventional vertical pump pollutes the work place or causes damage to the motor.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A vertical pump structure adapted to be mounted through a mounting opening of a water cooling tank, and the vertical pump structure comprising:
   a pump casing adapted to be mounted through the mounting opening of the water cooling tank and close the mounting opening of the water cooling tank; the pump casing comprising:
   a water inlet formed in a bottom of the pump casing;
   a water outlet; a position of the water outlet being higher than a position of the mounting opening of the water cooling tank;
   a drain hole formed in a wall of the pump casing, and a position of the drain hole being lower than the position of the mounting opening of the water cooling tank;
   an upper annular flange formed around an inner surface of the pump casing to form an upper mounting hole; a position of the upper mounting hole corresponding in height to the position of the mounting opening of the water cooling tank;
   a lower annular flange formed around the inner surface of the pump casing to form a lower mounting hole; the upper annular flange and the lower annular flange disposed apart from each other; a drain space formed between the upper annular flange and the lower annular flange and communicating with the drain hole; and a water outlet passage having
  a top opening communicating with the water outlet; and
  a bottom opening located under the lower annular flange and communicating with the water inlet;
a shaft mounted through the upper mounting hole and the lower mounting hole of the pump casing;
an upper shaft seal mounted between an inner surface of the upper mounting hole and the shaft, and sealing a gap formed between the inner surface of the upper mounting hole and the shaft;
a sealing cover detachably disposed between the inner surface of the upper mounting hole and the upper shaft seal; an outer annual surface of the sealing cover attached to the inner surface of the upper mounting hole; the sealing cover and the upper shaft seal together sealing the gap between the inner surface of the upper mounting hole and the shaft;
a lower shaft seal assembly mounted between an inner surface of the lower mounting hole and the shaft, and sealing a gap formed between the inner surface of the lower mounting hole and the shaft; an inner diameter of the upper mounting hole being greater than an outer diameter of the lower shaft seal assembly such that the lower shaft seal assembly passes through the upper mounting hole; and
three fixing bolts; the three fixing bolts annularly disposed apart from each other and located around the shaft; the three fixing bolts located in the drain space; the three fixing bolts fastened to the lower shaft sealing assembly and abutting against the shaft; a position of the three fixing bolts corresponding to the position of the drain hole in height.

2. The vertical pump structure as claimed in claim 1, wherein
  the vertical pump structure further comprises a motor mounting wall, which is annularly formed on a top of the pump casing and located above the upper annular flange;
  a top surface of the upper annular flange has at least one recess; the at least one recess extends under a periphery of the sealing cover;
  the pump casing has at least one service opening; a height position of the at least one service opening is between the top surface of the upper annular flange and a bottom surface of the motor mounting wall, the at least one service opening allows a screwdriver to insert into the at least one recess.

3. The vertical pump structure as claimed in claim 1, wherein a slope portion is formed on the lower annular flange and the slope portion is located under an opening of the drain hole.

4. The vertical pump structure as claimed in claim 1, wherein the sealing cover comprises:
  a rigid inner layer; and
  an elastic outer layer made of an elastic material and wrapping around the rigid inner layer, a rigidity of the rigid inner layer being greater than a rigidity of the elastic outer layer.

5. The vertical pump structure as claimed in claim 4, wherein the upper shaft seal is integrally formed on the elastic outer layer of the sealing cover.

6. The vertical pump structure as claimed in claim 5, wherein
  the vertical pump structure further comprises a motor mounting wall, which is annularly formed on a top of the pump casing and located above the upper annular flange;
  a top surface of the upper annular flange has at least one recess; the at least one recess extends under a periphery of the sealing cover;
  the pump casing has at least one service opening; a height position of the at least one service opening is between the top surface of the upper annular flange and a bottom surface of the motor mounting wall, the at least one service opening allows a screwdriver to insert into the at least one recess.

7. The vertical pump structure as claimed in claim 6, wherein a slope portion is formed on the lower annular flange and the slope portion is located under an opening of the drain hole.

* * * * *